(12) United States Patent
Sakamoto et al.

(10) Patent No.: US 8,961,714 B2
(45) Date of Patent: Feb. 24, 2015

(54) AUTOMOBILE SUSPENSION PART

(75) Inventors: Shogo Sakamoto, Inabe (JP); Yoshiya Inagaki, Inabe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/043,011

(22) Filed: Mar. 8, 2011

(65) Prior Publication Data

US 2011/0221151 A1    Sep. 15, 2011

(30) Foreign Application Priority Data

Mar. 15, 2010  (JP) ................. 2010-058167

(51) Int. Cl.
*C22C 21/08* (2006.01)
*B60G 9/00* (2006.01)

(52) U.S. Cl.
USPC .......... 148/415; 420/535; 280/124.1

(58) Field of Classification Search
USPC .......... 148/415, 417; 420/535; 280/124.1
See application file for complete search history.

(56) References Cited

U.S. PATENT DOCUMENTS

| | | | |
|---|---|---|---|
| 6,099,003 | A | 8/2000 | Olszewski et al. |
| 2002/0170697 | A1 | 11/2002 | Nakahara et al. |
| 2003/0010412 | A1 | 1/2003 | Matsumoto et al. |
| 2006/0185416 | A1 | 8/2006 | Nakahara et al. |
| 2009/0000705 | A1 | 1/2009 | Nakai et al. |
| 2010/0089503 | A1 | 4/2010 | Inagaki et al. |

FOREIGN PATENT DOCUMENTS

| | | |
|---|---|---|
| CN | 101337495 A | 1/2009 |
| JP | 2000-355206 | 12/2000 |
| JP | 2003-226124 | 8/2003 |
| JP | 2004-042079 | 2/2004 |
| JP | 2004-074978 | 3/2004 |
| JP | 2008-163445 | 7/2008 |
| JP | 2008-223108 | 9/2008 |

OTHER PUBLICATIONS

"Aluminum and Aluminum Alloys", ASM International, 1993, p. 585-586.*
Inagaki et al. "High Strength Aluminum Alloys for Automobile Suspension Systems", Kobe Steel Engineering Reports / vol. 55 No. 3 pp. 83-86 (Dec. 2005).
"Weight Reduction of Forged-aluminum Automotive Suspension," Kobe Steel Engineering Reports, Japan, Kobe Steel, Ltd., Aug. 21, 2009, vol. 59, No. 2, p. 22-26.

* cited by examiner

*Primary Examiner* — Roy King
*Assistant Examiner* — Janelle Morillo
(74) *Attorney, Agent, or Firm* — Oblon, Spivak, McClelland, Maier & Neustadt, L.L.P.

(57) ABSTRACT

A lightweight automobile suspension part having high strength is an aluminum alloy automobile suspension part having a through-hole, which has a yield strength of a normal section as a region where a crystal grain is not coarsened being 270 MPa or larger, and a minimum length between a rib end as a predetermined region on a side of the through-hole in a rib and a through-hole end as a predetermined region on a side of the through-hole in a web is 6 mm or larger.

2 Claims, 5 Drawing Sheets

AUTOMOBILE SUSPENSION PART

BACKGROUND OF THE INVENTION

1. Field of the Invention

The present invention relates to an automobile suspension part having a through-hole for weight saving and a manufacturing method thereof.

2. Description of the Related Art

Conventionally, 6000 series (JIS 6000 series) aluminum alloys such as 6106, 6111, 6003, 6151, 6061, 6N01 and 6063 aluminum alloys have been generally used for an automobile suspension part. Forging materials made of such 6000 series aluminum alloys have a high strength, high fracture toughness and relatively excellent corrosion resistance. The 6000 series aluminum alloys themselves consist of a fewer metal elements and therefore their scrap is easily reused as fused raw materials for 6000 series aluminum alloy, and therefore, the 6000 series aluminum alloys are excellent in recycling properties (for example, refer to Japanese Unexamined Patent Publication No. 2008-163445 and Japanese Unexamined Patent Publication No. 2008-223108).

Use of such 6000 series aluminum alloys can achieve higher strength of automobiles. Meanwhile, in recent years, the problem of warming caused by $CO_2$ exhausted by automobiles has become more serious. In order to reduce $CO_2$ exhausted by automobiles, weight saving of automobiles is effective.

SUMMARY OF THE INVENTION

In automobile suspension parts, it is important to achieve weight saving as well as to ensure strength. A through-hole has been formed on the conventional automobile suspension parts for weight saving. However, as a result of research by the present inventors, it is recognized that the formation of the through-hole generates a coarse crystal grain in a region in the vicinity of an inner side of a rib (a side where the through-hole is formed), thereby lowering the yield strength of this region, in turn, the strength of the automobile suspension part.

In consideration of the above problem, an object of the present invention is to provide a lightweight automobile suspension part having high strength and a manufacturing method thereof.

To achieve the above object, an automobile suspension part according to the present invention (hereinafter referred to as suspension part as necessary) is an aluminum alloy automobile suspension part having a through-hole, and has a yield strength of a normal section where a crystal grain is not coarsened being 270 MPa or larger and a minimum length between a rib end as a predetermined region on a side of the through-hole in a rib and a through-hole end as a predetermined region on a side of the through-hole in a web being 6 mm or larger.

With such configuration, the through-hole enables weight saving of the suspension part and the yield strength of the normal section being 270 MPa or larger results in high yield strength of the suspension part. In addition, since the minimum length between the rib end and the through-hole end is 6 mm or larger, no recrystallized section as a region where the crystal grain is coarsened occurs in the rib, preventing the strength of the suspension part from lowering.

A manufacturing method of the automobile suspension part according to the present invention is a manufacturing method of an aluminum alloy automobile suspension part having a through-hole, the automobile suspension part having a yield strength of a normal section as a region where a crystal grain is not coarsened being 270 MPa or larger, the method including an ingot material preparing step of preparing an ingot material, a heat treatment step of performing heat treatment of the ingot material, a shaping step of shaping the heat-treated ingot material to form a shaped member, a forging step of forging the shaped member, a through-hole forming step of forming a through-hole on the forged shaped member, and a thermal refining step of performing thermal refining of the forged shaped member on which the through-hole is formed, wherein in by forming a through-hole forming region as a region where the through-hole is formed in the forging step and removing the through-hole forming region in the through-hole forming step, the automobile suspension part is made so that a minimum length between a rib end as a predetermined region on a side of the through-hole in a rib and a through-hole end as a predetermined region on a side of the through-hole in a web is 6 mm or larger.

According to the manufacturing method, by forming the through-hole forming region in the forging step and removing the through-hole forming region in the through-hole forming step so that the minimum length between the rib end and the through-hole end is 6 mm or larger, weight saving of the suspension part can be achieved, and the suspension part having high strength, in which no recrystallized section occurs in the rib, can be manufactured.

The automobile suspension part according to the present invention enables weight saving through formation of the through-hole as well as reduction of $CO_2$ exhausted by automobiles. Even when the through-hole is formed, the automobile suspension part has excellent strength.

According to the manufacturing method of the automobile suspension part of the present invention, a lightweight automobile suspension part having high strength can be manufactured.

DESCRIPTION OF PREFERRED EMBODIMENTS

An automobile suspension part and a manufacturing method of the automobile suspension part according to the present invention will be described below in detail with reference to figures.

<Automobile Suspension Part>

Figure 1:
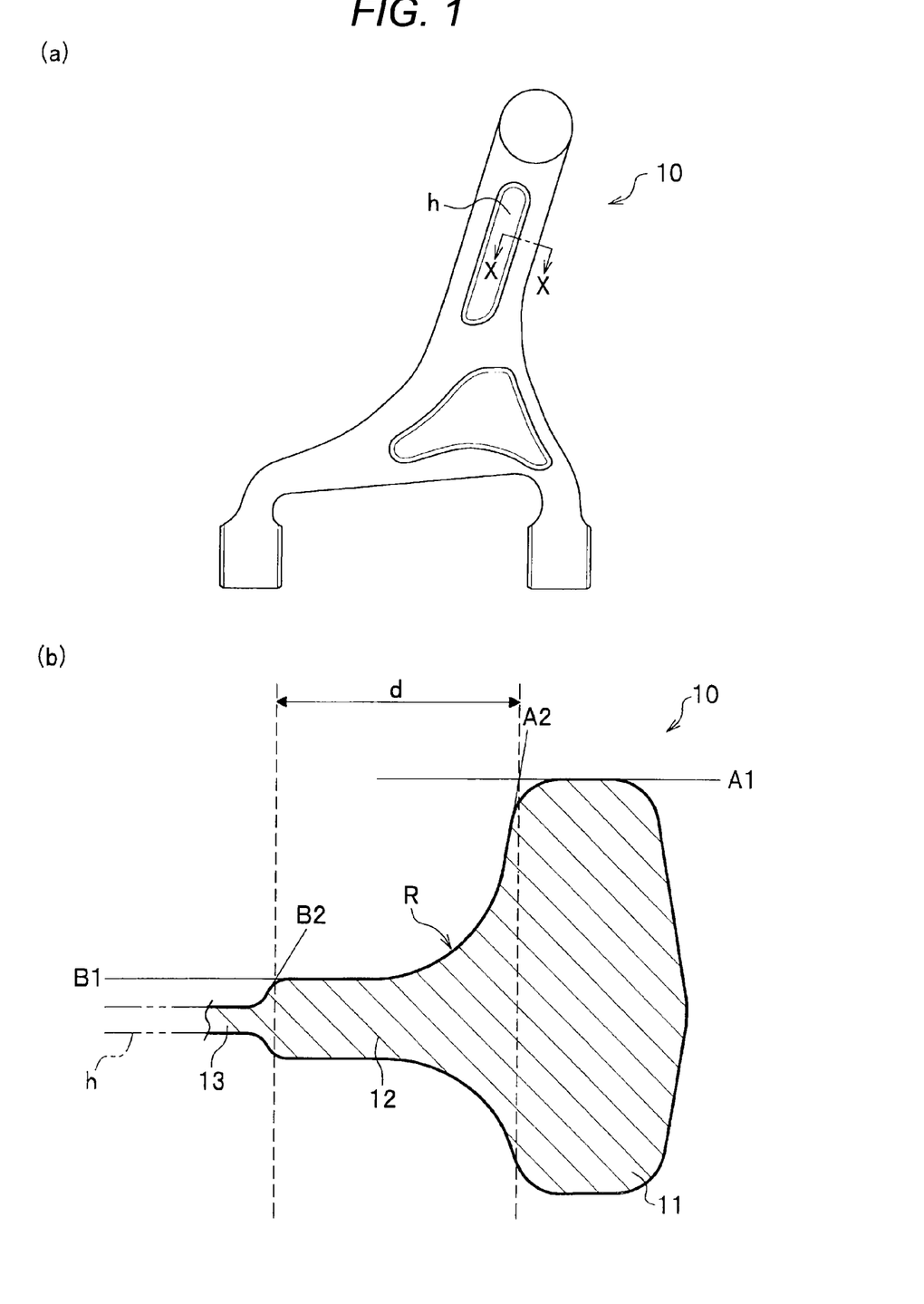
FIG. 1A is a schematic diagram showing an automobile suspension part according to the present invention and FIG. 1B is a schematic sectional diagram taken along an X-X line in FIG. 1A for illustrating a minimum length between a rib end and a through-hole end.

As shown in FIGS. 1A and 1B, the automobile suspension part according to the present invention (hereinafter referred to as suspension part as necessary) 10 is an aluminum alloy automobile suspension part 10 having a through-hole h. Here, the suspension part 10 refers to, for example, a suspension arm (L-shape), a lower arm, an upper arm, a knuckle and a link (I-shape) and FIG. 1A shows an upper arm.

Figure 2:
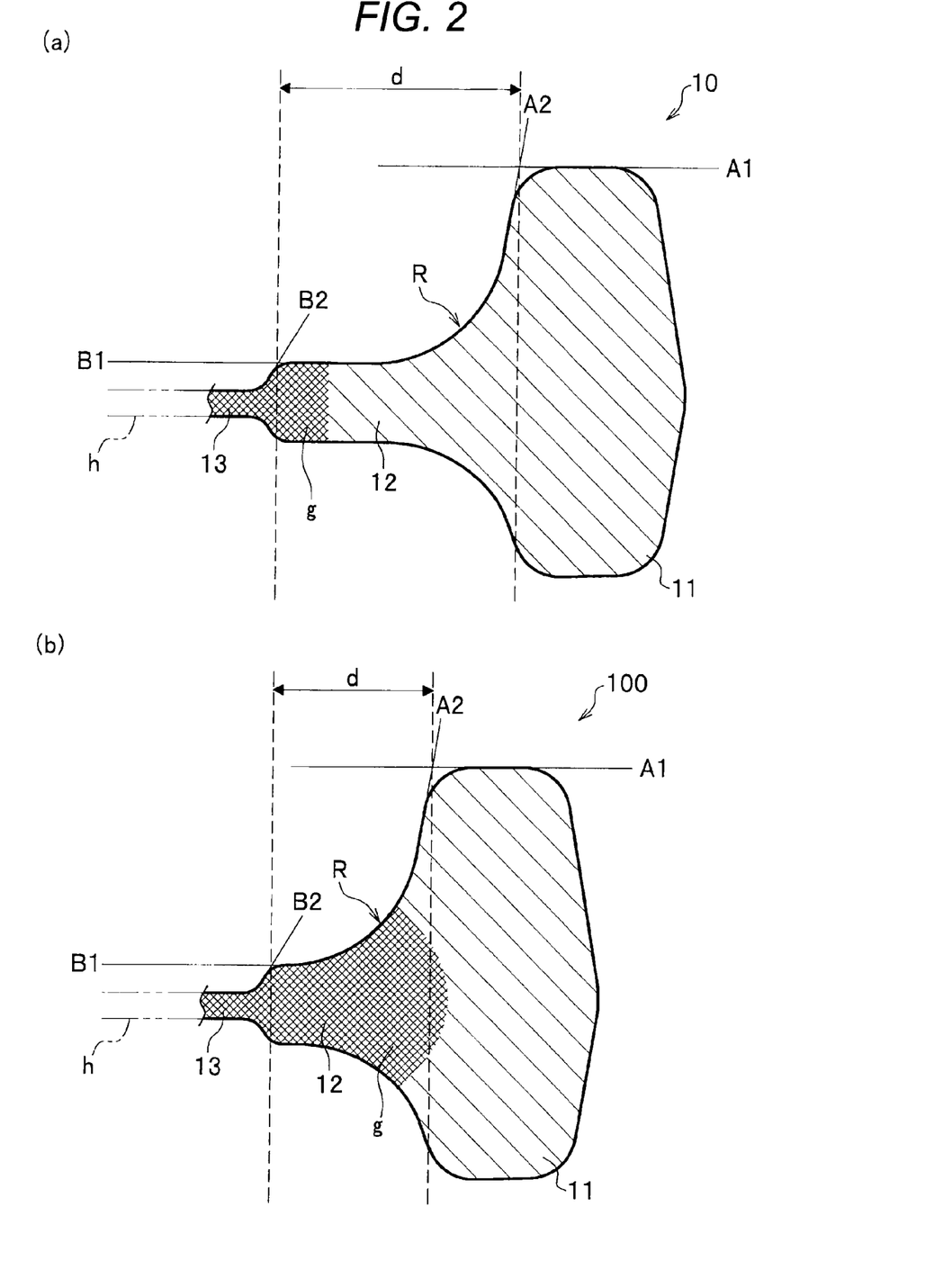
FIGS. 2A and 2B are schematic diagrams for illustrating a recrystallized section of the automobile suspension part.

In the suspension part 10, the yield strength of a normal section where the crystal grain is not coarsened (refer to FIG. 2) is 270 MPa or larger and a minimum length d between a rib end as a predetermined region on a side of the through-hole h in a rib 11 and a through-hole end as a predetermined region on a side of the through-hole h in a web 12 (hereinafter referred to as minimum length as necessary) being 6 mm or larger. Configuration of each component will be described later.

[Aluminum Alloy]

As a material for the suspension part 10, aluminum alloys, in particular, 6000 series (JIS 6000 series) aluminum alloys having high strength, high fracture toughness and relatively excellent corrosion resistance are generally used. The 6000 series aluminum alloys themselves consist of a fewer metal elements and therefore their scrap is easily reused as 6000 series aluminum alloy fused materials. Accordingly, the 6000 series aluminum alloys are excellent in recycling properties. As 6000 series aluminum alloys, for instance, 6106, 6111, 6003, 6151, 6061, 6N01, 6063 are cited.

[Yield Strength of Normal Section of 270 MPa or Larger]

The normal section according to the present invention refers to a region where the crystal grain is not coarsened. In a manufacturing process of the suspension part 10, in order to perform shearing for formation of the through-hole h, it is required to make a through-hole forming region as a region where a predetermined scope for forming the through-hole h, that is, a region where a hole is formed, to be thin to form the through-hole h. When the through-hole forming region is thick, a burr 13 is torn and thus, the shape of the inner side (the side of the through-hole h) of the web 12 becomes defective.

Specifically, for example, a shaped member having an outer diameter of 70 to 80 mm is made thinner to be 5 to 30 mm in thickness, and then, a region where a hole is to be formed is made thinner to be 1 to 3 mm in thickness to form the through-hole forming region. When the through-hole forming region of the shaped member is made thin, a large forging deformation occurs in the vicinity of the burr 13 and the web 12. Then, when the through-hole formed member where the through-hole h is formed is subjected to heat treatment, heat is applied to a region having much deformation, resulting in that a crystal grain is recrystallized in the vicinity of the burr 13 and the web 12, thereby coarsening the crystal grain.

A region where the crystal grain is not coarsened due to recrystallization is referred to as the normal section, and for example, a portion of a rib 11 (rib portion) and a part of the web 12 (portion of the web 12 other than the vicinity of the burr 13) correspond to the normal section (refer to FIG. 2A). The region where the crystal grain is not coarsened refers to a region having a recrystallization ratio of 10% or smaller.

Then, the yield strength of the normal section is set to 270 MPa or larger. By setting the yield strength of the normal section to 270 MPa or larger, the suspension part 10 has excellent strength.

The yield strength can be measured, for example, according to JIS Z 2241 and the recrystallization ratio can be measured by means of a sectional microscopic observation (optical microscope).

[Minimum Length Between Rib End and Through-Hole End: 6 mm or Larger]

The rib end according to the present invention refers to a predetermined region on the side of the through-hole h in the rib 11 of the suspension part 10, that is, an end of the inner side of the rib 11 (the side of the web 12) and the through-hole end refers to a predetermined region of the web 12 on the side of the through-hole h in the web 12 of the suspension part 10, that is, an end of the inner side of the web 12 (the side of the through-hole h). According to the present invention, more particularly, the rib end and the through-hole end are defined as follows.

As shown in FIG. 1B, a straight line (horizontal) A1 is drawn along a horizontal side surface of the rib 11 and a straight line A2 is drawn along a vertical side surface of the inner side of the rib 11. Using an intersection of the straight line A1 and the straight line A2 as an axis, a line is drawn perpendicular to the straight line A1 and a region where this line overlaps the rib 11 is defined as the rib end. A straight line (horizontal) B1 is drawn along a horizontal side surface of the web 12 and a straight line B2 is drawn along a vertical side surface of the inner side of the web 12. Using an intersection of the straight line B1 and the straight line B2 as an axis, a line is drawn perpendicular to the straight line B1 and a region where this line overlaps the web 12 is defined as the through-hole end. In the case of a mechanically pressed product (machine press product), an inclination of the straight line A2 is assumed to be 1 to 5 degrees that is necessary for releasing the forged member from a mold.

As shown in FIG. 1B, the surface shape of the suspension part 10 slightly varies in size on the front side (upper side in this figure) and on the back side (lower side in this figure) of the suspension part 10. However, in defining the rib end and the through-hole end according to the present invention, a smaller distance between the rib end and the through-hole end, that is, a minimum distance is used as a reference.

The minimum length d between the rib end and the through-hole end is set to 6 mm or larger. In the suspension part 10, the through-hole h is formed for weight saving. As shown in FIG. 2A, when the through-hole h is away from the rib 11 (that is, the minimum length d is 6 mm or larger), a region where the crystal grain is coarsened by recrystallization (hereinafter referred to as recrystallized section as necessary) g does not occur in the rib 11, while as shown in FIG. 2B, when the through-hole h is closer to the rib 11 in the suspension part 10p (that is, the minimum length d is less than mm), the formation of the through-hole h causes the recrystallized section g in the vicinity of a region in the vicinity of the inner side of the rib 11.

Since the recrystallized section g has a smaller yield strength than the normal section, when the recrystallized section g occurs in the rib 11, the yield strength of the region lowers, thereby decreasing the strength of the suspension part 100. In order to prevent such phenomenon, it is required to set the minimum length d to 6 mm or larger. When the minimum length d is 6 mm or larger, no recrystallized section g occurs in the rib 11.

<Others>

Since the effect of weight saving is small when the rib 11 is short and shaping is difficult when the rib 11 is tall, the height of the rib 11 is preferably 10 to 70 mm. Since shaping is difficult when the web 12 is thin and the effect of weight saving is small when the web 12 is thick, the thickness of the web 12 is preferably, 5 to 10 mm. In order to prevent defects such as tearing in shearing and to prevent excessive deforming loads, the thickness of the burr 13 (region where the through-hole is formed) is preferably, 1 to 3 mm. To prevent defects due to forging failure, a curvature radius R of an inclined plane on the side of the straight line A2 is preferably, 2 to 15 mm.

It is noted that the thickness of the web 12 and the curvature radius R are unrelated to the yield strength of the recrystallized section g in the rib 11.

<Manufacturing Method of Automobile Suspension Part>

Figure 3:
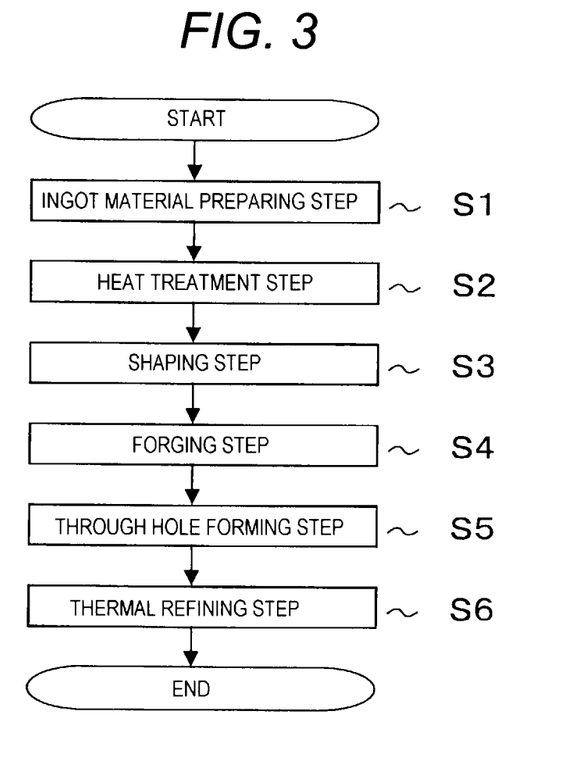
FIG. 3 is a flowchart of a manufacturing method of the automobile suspension part according to the present invention.

As shown in FIG. 3, the manufacturing method of the automobile suspension part according to the present invention (hereinafter referred to as manufacturing method of automobile suspension part as necessary) is a manufacturing method of an aluminum alloy automobile suspension part having a through-hole, the automobile suspension part having the yield strength of the normal section as a region where the crystal grain is not coarsened being 270 MPa or larger, the method including an ingot material preparing step S1, a heat treatment step S2, a shaping step S3, a forging step S4, a through-hole forming step S5 and a thermal refining step S6. Each step will be described below. The aluminum alloy, the yield strength and the through-hole are the same as those described with respect to the suspension part, and thus, description thereof is omitted.

<Ingot Material Preparing Step>

The ingot material preparing step S1 is a step of preparing an ingot material. The ingot material preparing step S1 includes a fusing and casting step of fusing and casting an aluminum alloy to prepare an ingot and a cutting step of cutting the ingot to a predetermined length.

In the fusing and casting step, for example, a long round-bar shaped ingot of a diameter of 70 mm is made of a liquid containing fused aluminum alloy having a predetermined composition. The method of fusing and casting the aluminum alloy is not specifically limited and may employ any conventionally known method. For example, the aluminum alloy can be fused in a vacuum induction furnace and casted according to a continuous casting method or a semi-continuous casting method.

In the cutting step, an ingot (long round-bar shaped ingot) is cut with a cutter to be an ingot material (round-bar shaped member) having a ratio of length to diameter of 3 or larger. Prior to cutting, the ingot may be peeled.

<Heat Treatment Step>

The heat treatment step S2 is a step of performing heat treatment (homogenizing heat treatment) of the ingot material. By performing the heat treatment of the ingot material, an intermetallic compound crystallized during casting is diffused and a solid solution is formed, resulting in that configuration is homogenized. The heat treatment may be performed in a furnace according to ordinary conditions. By performing the heat treatment in such conditions, sufficient homogenization can be achieved. For the heat treatment, an air furnace, an induction furnace, a nitre furnace or the like is used according to circumstances.

<Shaping Step>

The shaping step S3 is a step of shaping the heat-treated ingot material to form a shaped member. For instance, roll forming and bending are cited as shaping. In roll forming, for example, the ingot material is shaped to a stepped roll formed member by use of a roll forming device. Here, in the case of preparing a shaped member other than an I-shaped member, such as an L-shaped suspension arm, bending is performed after roll forming. For example, bending can be performed by use of a bending mold provided in a press mold.

<Forging Step>

The forging step S4 is a step of forging the shaped member. The ingot material (shaped member) cooled to a room temperature after the heat treatment is heated to a forging start temperature again. Then, the shaped member is hot-forged through forging by mechanical press, hydraulic press or the like to form a final product shape of the suspension part.

This forging includes, for example, primary forging as rough forging, secondary forging as intermediate forging and finish forging. Primary forging is a step of pressing the shaped member with a mold for primary forging and through this step, a primary press member is shaped. Secondary forging is a step of pressing the primary press member with a mold for secondary forging and through this step, a secondary press member is shaped. Finish forging is a step of pressing the secondary press member with a mold for finish forging and through this step, the forged member is manufactured. These primary forging, secondary forging and finish forging are continuously performed without being interrupted by reheating. For example, forging may be performed under the forging starting temperature of 400 to 550° C.

In the forging step S4, the through-hole forming region as a region where the through-hole is formed is formed. The thickness of the through-hole forming region is set to 1 to 3 mm, for example. By adjusting the extent of the through-hole forming region through forging, a suspension part having the minimum length of 6 mm or larger can be obtained after punching of the through-hole forming region in the through-hole forming step S5. In other words, the position of the through-hole end can be adjusted by adjusting the through-hole forming region.

In the forging step S4, the thickness reduction ratio is 40 to 90%, for example. Forging is performed so that the part with higher thickness reduction ratio is located in the inner side of the web (the side where the through-hole is formed).

<Through-Hole Forming Step>

The through-hole forming step S5 is a step of forming the through-hole on the forged shaped member. In the through-hole forming step S5, the through-hole is formed by removing the through-hole forming region to form the suspension part having the minimum length between the rib end as a predetermined region on the side of the through-hole in the rib and the through-hole end as a predetermined region on the side of the through-hole in the web being 6 mm or larger.

Figure 4:
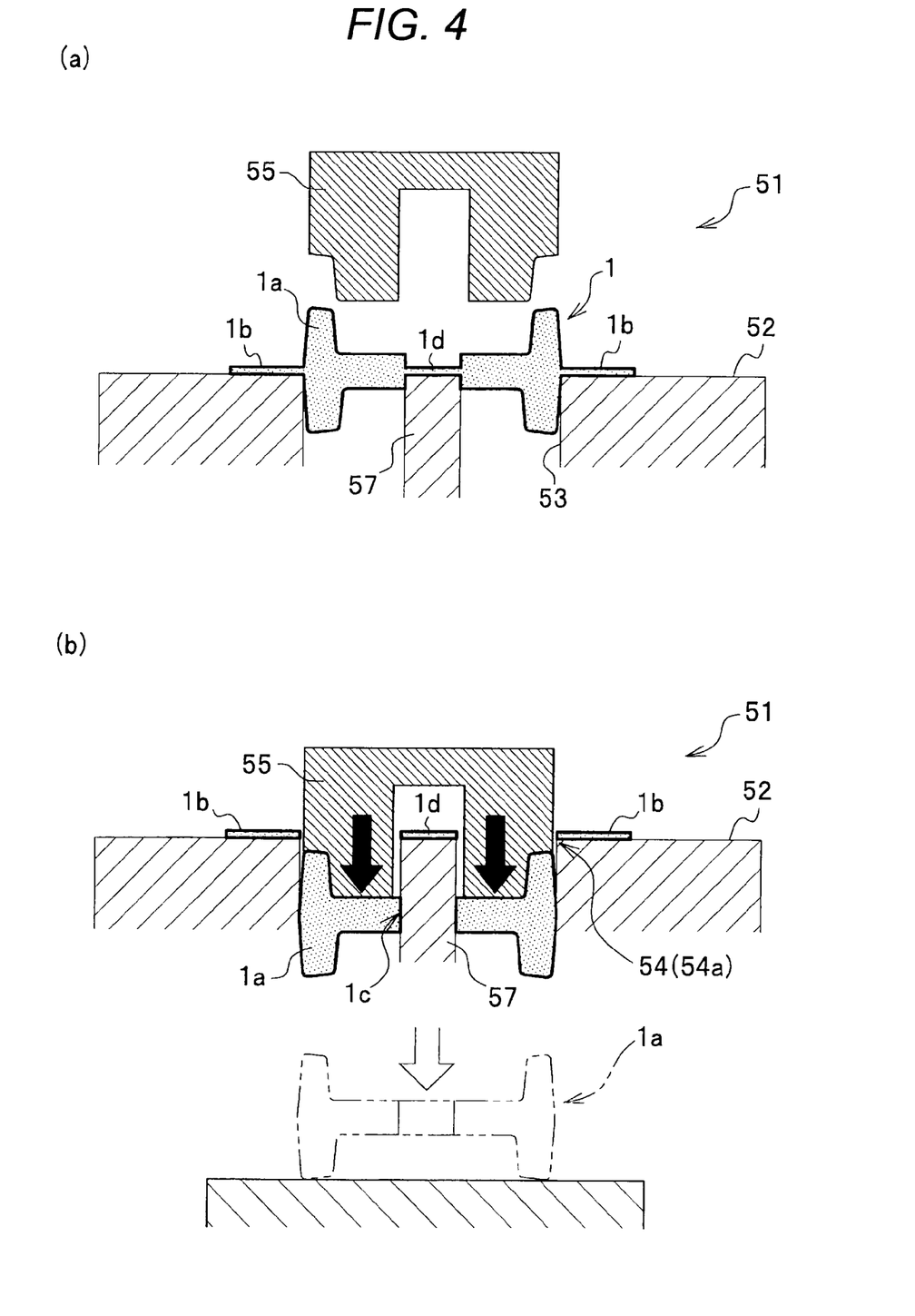
FIGS. 4A and 4B are explanation diagram showing summary of a trimming method in a through-hole forming step.

The through-hole can be formed according to any conventionally known method. For example, as shown in FIGS. 4A, 4B, the through-hole 1c can be formed on a product part 1a by means of a trimming device 51 at the same time as shearing removal of a burr 1b. In the trimming device 51, (1) a forged member 1 is placed on a trimming die 52 and a punch 57. (2) A punch 55 located above the trimming die 52 is introduced into a hole 53 of the trimming die 52 and the forged member 1 is pushed into the hole 53, resulting in that a blade 54a of an edge part 54 shears and removes the burr 1b of the forged member 1. At the same time, a burr 1d is removed to form the through-hole 1c. In this manner, in the trimming device 51, one vertical pressing operation of the punches 55, 57 can achieve both of shearing (trimming) of the burr 1b and formation of through-hole 1c.

<Thermal Refining Step>

The thermal refining step S6 is a step of performing thermal refining of the through-hole formed member where the through-hole is formed. Specifically, the forged shaped member on which the through-hole is formed is subjected to solution heat treatment, quenching treatment and age-hardening treatment in this order.

After forging, in order to obtain strength, fracture toughness and corrosion resistance necessary for the suspension part, thermal refining treatment such as T6, T7 is performed. T6 is artificial age-hardening treatment to obtain maximum strength after the solution heat treatment and the quenching treatment. T7 is excessive age-hardening treatment performed under conditions exceeding conditions of the artificial age-hardening treatment to obtain maximum strength after the solution heat treatment and the quenching treatment. That is, the thermal refining step S6 includes the solution heat treatment step, the quenching treatment step and the age-hardening treatment step.

The solution heat treatment may be performed under ordinary conditions, for example, under a condition in which the member is held in a temperature range of 520 to 570° C. for 1 to 7 hours. For the solution heat treatment, an air furnace, an induction furnace, a nitre furnace or the like is used according to circumstances. The quenching treatment may be also performed under ordinary conditions.

In the age-hardening treatment, conditions of the thermal refining treatment such as T6, T7 may be selected from ordinary conditions, for example, a temperature range of 170 to 220° C. and holding time of 3 to 6 hours. For the age-hardening treatment, an air furnace, an induction furnace, an oil bath or the like is used according to circumstances.

In carrying out the present invention, another step may be inserted between the above-mentioned steps or before or after the above-mentioned steps so as not to have an adverse effect on the steps. For example, a foreign matter removing step of removing foreign matters such as wastes may be included, and before or after the thermal refining step S6, a machining step and a surface treatment step of performing machining and surface treatment of the member, which are necessary for the suspension part may be included.

EXAMPLES

The embodiment for carrying out the present invention has been described above. Examples for confirming effects of the present invention will be described as compared to Comparative examples that do not satisfy requirements of the present invention. The present invention is not limited to these examples.

The minimum length d between the rib end and the through-hole end was adjusted to have a value shown in Table 1.

<Estimation Method>

Mass of the test piece was measured, and strength of the test piece, yield strength of the normal section, yield strength of the recrystallized section and the recrystallization ratio of the rib were also measured.

[Mass]

The mass was calculated as relative mass assuming that the mass of the test piece having no through-hole (Comparative example 3) is 100. It is determined that a test piece having a value smaller 100 is reduced in weight.

[Test Piece Strength]

Figure 5:
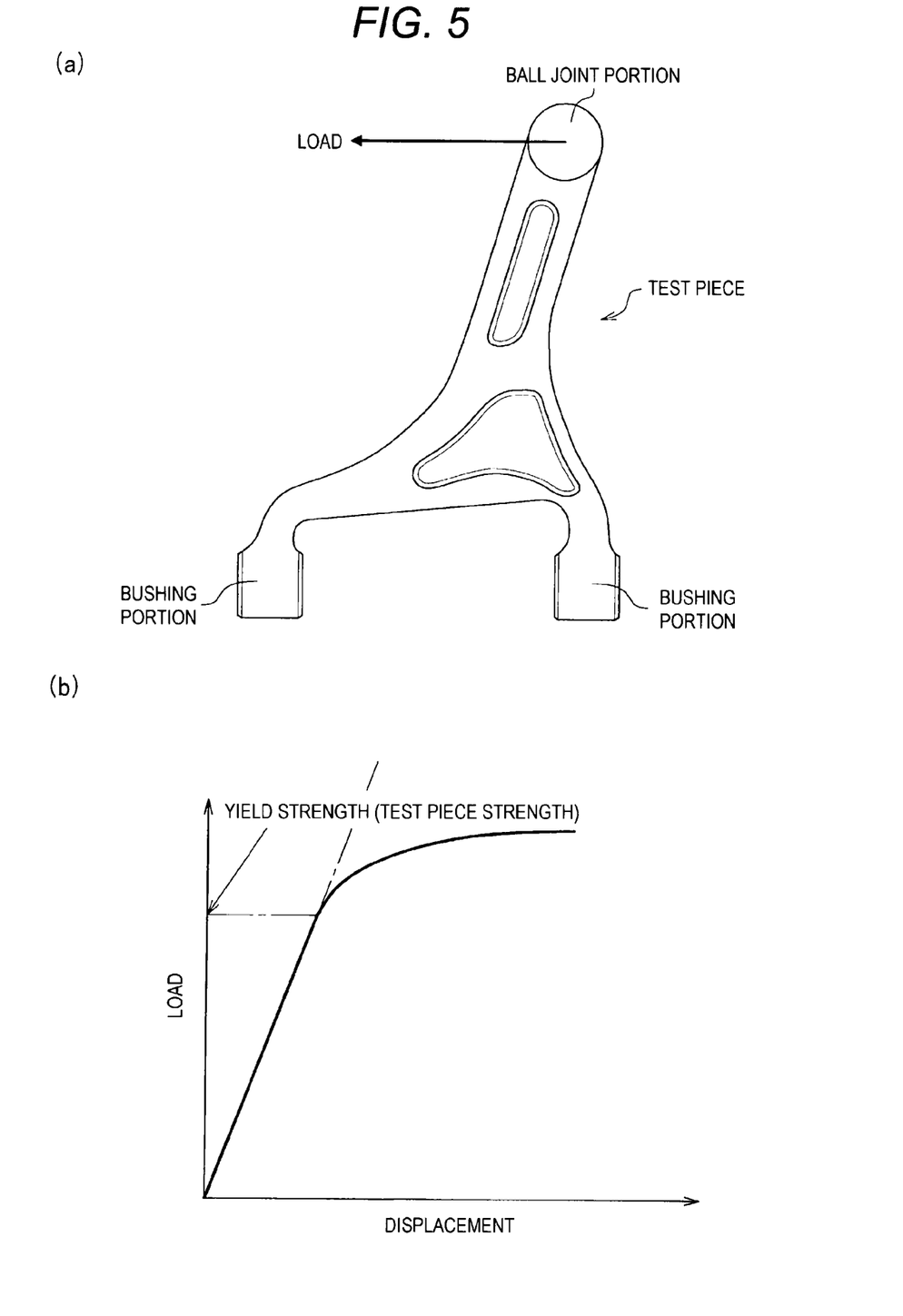
FIG. 5A is a schematic diagram showing a test piece in Examples and FIG. 5B is a load-displacement graph showing relationship between load exerted on a test piece and displacement in Examples.

The test piece strength was calculated by performing a strength test of fixing a bush part of the test piece and applying a load to a ball joint part, and measuring yield strength. FIG. 5B is a load-displacement graph showing relationship between the load exerted on the test piece and displacement.

The test piece strength was calculated assuming that the test piece strength of the test piece having no through-hole (Comparative example 3) is 100. Then, it is determined that a test piece having a value smaller 100 has excellent material strength.

[Yield Strength]

As the yield strength, the yield strength of the normal section and the yield strength of the recrystallized section were measured according to JIS Z 2241. Then, the yield strength was calculated as relative strength assuming that the yield strength of the normal section of the test piece having no through-hole (Comparative example 3) is 100.

[Recrystallization Ratio]

As the recrystallization ratio, the recrystallization ratio of the rib was measured by means of sectional microscopic observation (optical microscope). The results are shown in Table 1.

TABLE 1

| | Minimum length d (mm) | Mass (relative mass) | Test piece strength (relative strength) | Yield strength (normal section) (relative strength) | Yield strength (recrystallized section) (relative strength) | Recrystalization ratio (rib) (%) |
|---|---|---|---|---|---|---|
| Example 1 | 6 | 93 | 100 | 100 | 92 | 10 |
| Example 2 | 8 | 93.5 | 100 | 100 | 92 | 10 |
| Example 3 | 10 | 93.9 | 100 | 100 | 92 | 10 |
| Comparative example 1 | 2 | 92 | 98.7 | 100 | 92 | 20 |
| Comparative example 2 | 4 | 92.5 | 99.3 | 100 | 92 | 15 |
| Comparative example 3 | No hole | 100 | 100 | 100 | 92 | 10 | d: minimum length between rib end and through hole end

<Preparation of Test Piece>

First, an aluminum alloy ingot having the same composition as a JIS 6061 alloy was fused and continuously casted to prepare an ingot material. This ingot material was subjected to the homogenizing heat treatment, and then, subjected to roll forming and bending to form shaped members. Next, these shaped members are heated and hot-forged, and then, the shaped members, excepting a part of them are formed with a through-hole. After that, the shaped members are subjected sequentially to the solution heat treatment, the quenching treatment and the artificial age-hardening treatment, as T6 treatment, to form a test piece having in all regions the yield strength shown in FIG. 5A being 270 MPa or larger.

As shown in Table 1, since Examples 1 to 3 satisfied the scope of the present invention, the test pieces in Examples 1 to 3 each had smaller mass than the test piece where no through-hole was formed (Comparative example 3), thereby achieving weight saving. Further, the test piece strength was equivalent to that in Comparative example 3, and had excellent material strength. In addition, the yield strength was excellent and the recrystallization ratio of the rib was also lower than that in Comparative examples 1, 2.

On the other hand, since Comparative examples 1 to 3 did not satisfy the scope of the present invention, following results were obtained.

Since the minimum length (d) between the rib end and the through-hole end in Comparative examples 1, 2 did not satisfy the scope of the present invention, the test piece strength was poor.

Since the through-hole was not formed in Comparative example 3, the mass was large and thus, weight saving could not achieved.

Like the 6061 alloy, even alloys other than 6061 (ex. 6106, 6111, 6003, 6151, 6N01, 6063), as long as they satisfied the configuration of the present invention, could obtain more excellent results than alloys that did not satisfy the configuration of the present invention.

Although the present invention has been described in detail with reference to the embodiment and the examples, the subject matter of the present invention is not limited to the abovementioned matter and scope of right of this invention must be widely interpreted based on description in claims. As a matter of course, contents of the present invention can be widely modified and changed based on the description.

What is claimed is:

1. An aluminum alloy automobile suspension part formed by forging, and comprising a rib, a web formed at an end of the rib, and a through-hole in the web, wherein a coarsened recrystallized section with a recrystallization ratio of >10% does not occur in the rib, wherein
    the rib is part of a normal section where a recrystallization ratio is ≤10%, a yield strength of said normal section is 270 MPa or larger, and
    a minimum length between a rib end and a through-hole end is 6 mm or larger.

2. The aluminum alloy automobile suspension part according to claim 1 wherein the aluminum alloy is a 6000 series aluminum alloy.

* * * * *